May 9, 1950     I. A. WYANT     2,506,823
COPPER-COOLED BRAKE DRUM
Filed Sept. 5, 1947     2 Sheets-Sheet 1
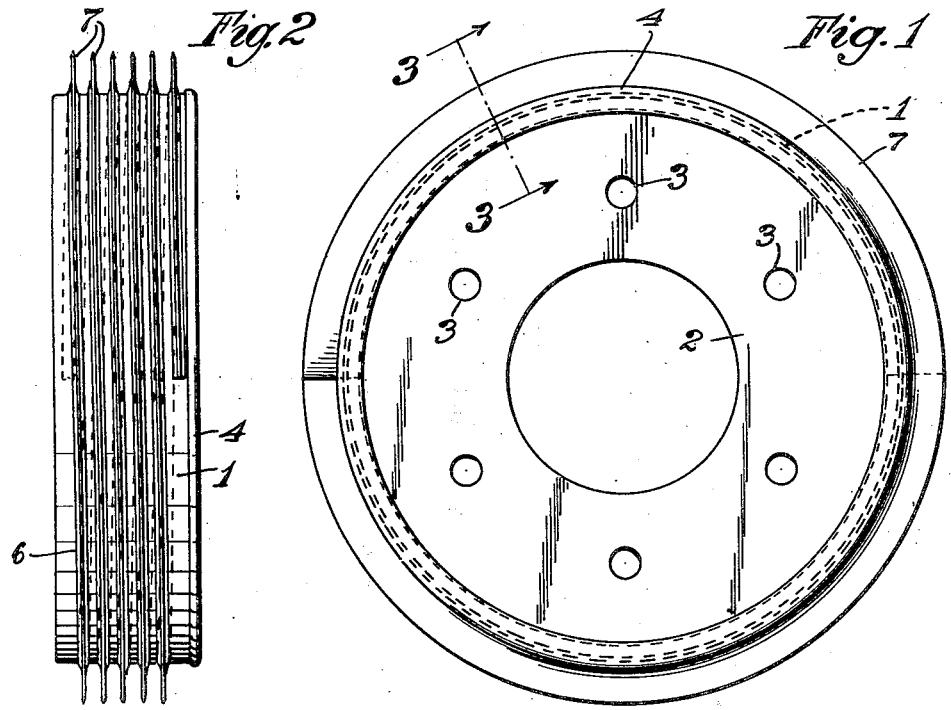
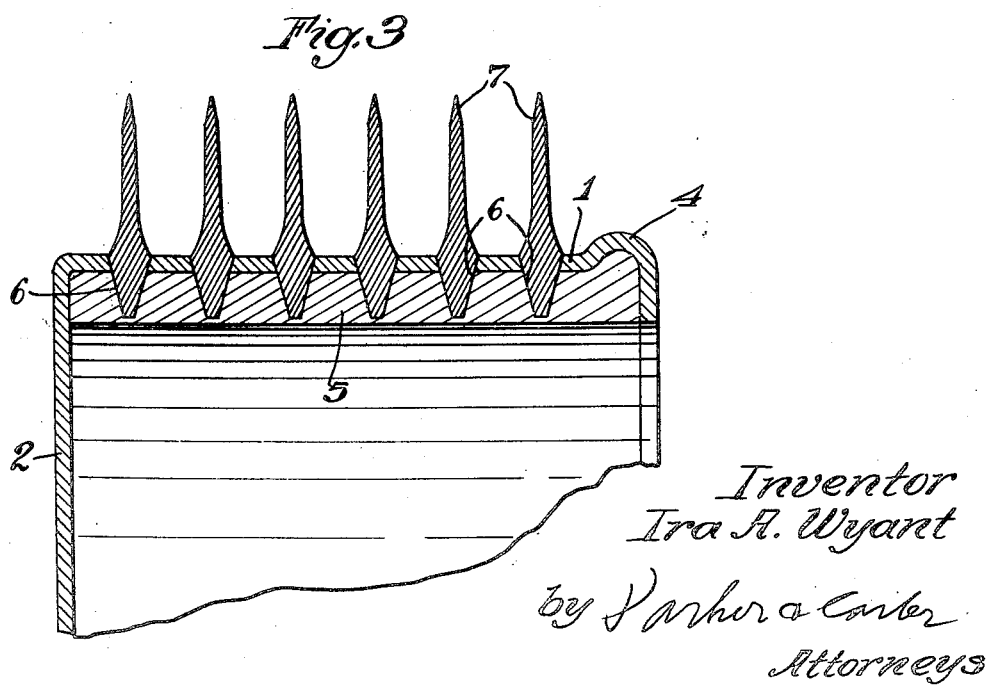
Inventor
Ira A. Wyant
by Parker & Carter
Attorneys May 9, 1950 — I. A. WYANT — 2,506,823
COPPER-COOLED BRAKE DRUM
Filed Sept. 5, 1947 — 2 Sheets-Sheet 2

Inventor
Ira A. Wyant
by Parker & Carter
Attorneys.

Patented May 9, 1950

2,506,823

UNITED STATES PATENT OFFICE 2,506,823

COPPER-COOLED BRAKE DRUM

Ira A. Wyant, Muskegon Heights, Mich., assignor to Campbell, Wyant & Cannon Foundry Co., Muskegon Heights, Mich., a corporation of Michigan Application September 5, 1947, Serial No. 772,322

4 Claims. (Cl. 188—218)

1

My invention relates to improvements in brake drums for automotive vehicles and the like, and has for one object to provide means for rapidly cooling a brake drum wherein a great amount of heat is developed. The invention is especially applicable to brake drums for airplanes, where heavy loads and very sudden stoppage of high speed planes are in order.

A cast iron braking surface has proven to be thoroughly satisfactory so far as the frictional effect of the braking act is concerned. The difficulty is that cast iron, which makes a splendid friction surface, is unfortunately a poor conductor of heat, and so while the cast iron ring and brake combination easily furnishes a frictional resistance to arrest travel, the difficulty is that the temperatures generated are so high that cast iron is unable to carry the heat away with sufficient rapidity and so the entire assembly tends to burn up.

A metal of high conductivity, such as copper, will absorb the heat and dissipate it rapidly, but copper is not a good friction material, and it lacks the necessary strength.

I propose, therefore, to provide a brake drum which will include the well-known combination of a steel drum with a cast iron liner, and to add to this assembly means for rapidly conducting the heat from the point at which it is generated through the liner ring, and through the steel drum for dissipation at a point outside of the drum.

I propose to accomplish this by first casting, in a well-known manner, into a steel ring a gray iron liner which will be cast at such temperature that the steel and iron will fuse together. This produces the well-known cast iron lined steel shell brake drum used on the great majority of the automobiles and trucks in this country.

I propose thereafter to groove spirally the steel drum and gray iron liner, the groove extending from the outer periphery of the steel shell, inwardly through it and through the gray iron liner, but terminating at a point short of the inner periphery of the liner. Thereafter I propose to wind into this spiral groove a copper fin or ribbon which will extend to the bottom of the groove and will project outwardly well beyond the outer periphery of the drum. This copper ribbon will be held in place by pressing or soldering or any other suitable heat treating, so as to provide a free and unobstructed path for the conduct of heat from a point adjacent the inner periphery of the cast iron liner, through the liner and the shell, to the area

2 outside the drum, where air can pick up heat from the exposed portion of the copper conducting ribbon.

My invention is illustrated more or less diagrammatically in the accompanying drawings, wherein:

Figure 1 is a side elevation of the assembled brake drum;

Figure 2 is a plan view of the brake drum;

Figure 3 is a section along the line 3—3 of Figure 1;

Like parts are indicated by like characters throughout the specification and drawings.

Figure 4:
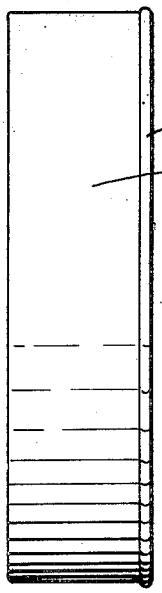
Figure 4 is a plan view of the brake drum before the spiral grooves have been formed.
Figure 5:
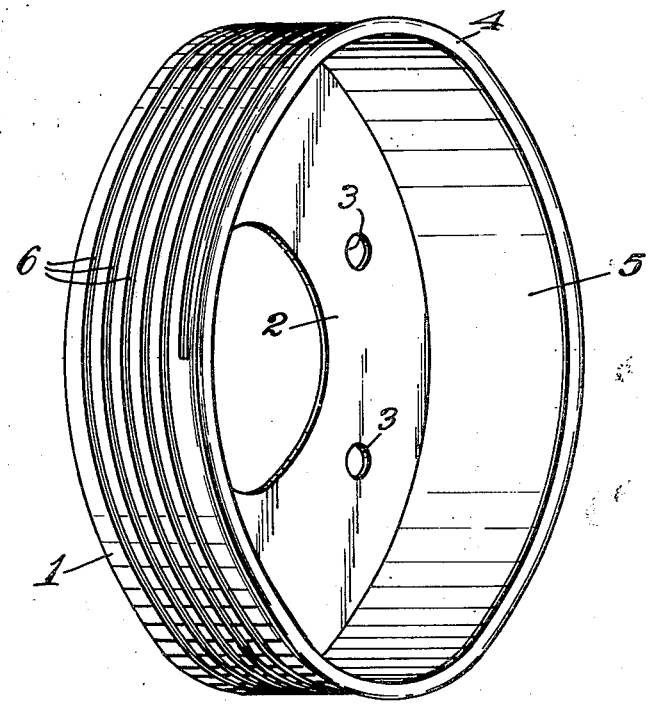
Figure 5 is a perspective of the brake drum before the copper ribbon has been put in place.

1 is a steel shell. It has an inwardly extending flange 2 perforated at 3 for attachment to any suitable wheel. At the other end of the shell, in opposition to the flange, it is provided with a reinforcing bead 4. 5 is a cast iron liner poured centrifugally in the shell as the shell spins in the usual way well known to the art. The liner fills the bead 4, abuts against the flange 2, and is fused to the shell.

6 is a spiral groove cut through the outer periphery of the shell 1 deep into the body of the liner 5 but terminating short of the inner periphery of the liner. Thus the shell is left in such shape that the inner portion of the liner holds all the parts together, and the weakening of the shell and liner as the result of the grooving is not sufficient to interfere with subsequent treatment of the shell. 7 is a spirally coiled copper ribbon thicker intermediate its edges than it is at either edge, the inner portion of the ribbon being of identically the same shape as the cross section of the groove 6, the outer portion of the ribbon extending further beyond the steel shell 1 than it does inwardly into the liner, and tapered to form, at the outer edge, a relatively thin body.

This ribbon will first be formed and then spirally coiled, and then inserted into the groove 6. The ribbon will preferably be given an initial set such that the diameter of the coil is somewhat less than its diameter as it is placed in the groove, and flux and solder will be introduced with the coil into the groove either by being placed into the groove in the first instance or by being applied to the coil before the coil is inserted. The coil will be firmly held mechanically in the groove, and then by induction heating the temperature of the shell and liner will be raised sufficiently to form a brazed or soldered joint between the ribbon and the walls of the groove so that there is such an intimate contact between the copper ribbon and the remainder of the drum that a minimum of resistance to heat transfer will prevail.

Thereafter the liner will be bored out to provide a smooth, running fit for the brake shoe, and the thickness of the liner will be cut away substantially to the level of the inner edges of the copper conducting ribbon. Preferably enough gray iron will be left to mask the ribbon. For example, gray iron of the thickness of 1/64 of an inch or something of that order will be left so as to provide a continuous gray iron braking surface. However, the distance between this braking surface and the distance between the successive coils of ribbon will be such that the distance through which heat must travel through the gray iron liner from the point where it is engaged by the brake shoe and heat is generated, through the low conductivity gray iron, to the conducting ribbon, will be reduced to a minimum so that it will be a rapid, substantially unobstructed heat flow radially outward from the braking surface through the copper ribbon to the area outside the steel drum, where heat may be dissipated to the air.

Because the copper ribbon is an excellent conductor of heat, heating in a furnace or with a torch would not be satisfactory because the copper conductor would remove heat too rapidly. However, induction heating, sending up currents in the high resistance body of the cast iron drum, will generate heat at the point where it is needed; that is, where it melts the solder and solders or presses or fuses or otherwise fastens the drum and the copper fins together.

I claim:

1. A brake drum comprising a steel shell, a cast iron liner, fused therein, having a continuous, smooth, cylindrical braking surface on its inner periphery, a ribbon of metal of higher conductivity than the liner, wound about the shell, penetrating through the shell into the liner adjacent the braking surface and extending outwardly beyond the shell to provide heat transfer areas exposed to the air, the ribbon being thicker adjacent the steel shell than it is adjacent either edge.

2. A brake drum comprising a steel shell, a cast iron liner fused therein, a sprial groove extending a plurality of times around the shell, penetrating through it into the body of the liner and terminating adjacent the inner periphery thereof, the groove being wider at the shell than it is at its bottom, a ribbon of metal of higher conductivity than the liner, wound about the shell, penetrating through the shell into the liner, the ribbon being tapered in thickness to conform to the thickness of the groove, the opposed sides of the ribbon being bonded to the opposed sides of the groove.

3. A brake drum comprising a steel shell, a cast iron liner fused therein, a spiral groove extending a plurality of times around the shell, penetrating through it into the body of the liner and terminating adjacent the inner periphery thereof, the groove being wider at the shell than it is at its bottom, a ribbon of metal of higher conductivity than the liner, wound about the shell, penetrating through the shell into the liner, the ribbon being tapered in thickness to conform to the thickness of the groove, the opposed sides of the ribbon being bonded to the opposed sides of the groove, the liner having a generally cylindrical braking surface on its inner periphery adjacent the bottom of the groove.

4. A brake drum comprising a cylindrical steel shell, there being a spiral slot extending substantially from end to end of the shell and open radially through the shell from inner to outer surfaces thereof, a continuous spiral ribbon of metal of higher heat conductivity than the shell, entirely filling the slot extending from end to end thereof and extending throughout its entire length both inwardly and outwardly with respect to the shell, a cast iron liner fused in the shell and fused to that part of the ribbon which extends inwardly from the inner periphery of the shell, a general cylindrical braking surface on the inner periphery of the liner, the inner extremity of the ribbon being closer to the braking surface than it is to the inner periphery of the shell.

IRA A. WYANT.

REFERENCES CITED

The following references are of record in the file of this patent:

UNITED STATES PATENTS

| Number | Name | Date |
|---|---|---|
| 1,473,366 | Walther | Nov. 6, 1923 |
| 1,702,391 | Price | Feb. 19, 1929 |
| 1,995,697 | Whitacre | Mar. 26, 1935 |
| 2,008,173 | Dake et al. | July 16, 1935 |
| 2,035,142 | Campbell | Mar. 24, 1936 |
| 2,213,829 | Van Halteren | Sept. 3, 1940 |

FOREIGN PATENTS

| Number | Country | Date |
|---|---|---|
| 499,511 | Great Britain | Jan. 25, 1939 |